Aug. 6, 1957 J. J. CASAGRANDE 2,802,201

RECORDING APPARATUS AND SYSTEM

Filed Sept. 20, 1954 4 Sheets-Sheet 1

INVENTOR.
Jere J. Casagrande
BY
Flehr and Swain
ATTORNEYS

Aug. 6, 1957 J. J. CASAGRANDE 2,802,201

RECORDING APPARATUS AND SYSTEM

Filed Sept. 20, 1954 4 Sheets-Sheet 2

INVENTOR.

Jere J. Casagrande

BY

Fisher & Swain

ATTORNEYS

Aug. 6, 1957 J. J. CASAGRANDE 2,802,201

RECORDING APPARATUS AND SYSTEM

Filed Sept. 20, 1954 4 Sheets-Sheet 3

INVENTOR.
Jere J. Casagrande
BY
Fliehr & Swain
ATTORNEYS

Aug. 6, 1957 J. J. CASAGRANDE 2,802,201

RECORDING APPARATUS AND SYSTEM

Filed Sept. 20, 1954 4 Sheets-Sheet 4

INVENTOR.
Jere J. Casagrande
BY
Flehr and Swain
ATTORNEYS

United States Patent Office 2,802,201

Patented Aug. 6, 1957

2,802,201

RECORDING APPARATUS AND SYSTEM

Jere J. Casagrande, Belmont, Calif., assignor to Ampex Corporation, Redwood City, Calif., a corporation of California Application September 20, 1954, Serial No. 457,146

4 Claims. (Cl. 340—174)

This invention relates generally to magnetic recording apparatus and methods suitable for use in earth well logging systems.

As is well known to those familiar with systems used for the logging of earth wells, it is common to use a plurality of vertically spaced detecting devices which are lowered into the well and which produce signals which can be recorded and subsquently interpreted to reveal various conditions. The electrical current variations produced by the indicating devices generally involve low frequencies ranging from 0 to 5 cycles per second. It is customary to record all of the current variations produced by the indicating devices at the surface of the well by use of a conventional pen type recorder. However, before recording it generally is desirable to interpose a time delay in the recording of certain of the indications, thereby compensating for the vertical spacing between the various detecting devices. The present invention relates to a magnetic recording and reproducing apparatus which can be used to advantage to secure such delays.

In general it is an object of this invention to provide apparatus and method of the above character which is capable of effectively and efficiently recording and reproducing low frequency current variations.

Another object of the invention is to provide an apparatus of the above character which will facilitate adjustments to secure the desired time delays.

Additional objects and features of the invention will appear from the following description in which the preferred embodiment has been set forth in detail in conjunction with the accompanying drawing.

Referring to the drawing.

Figure 1:
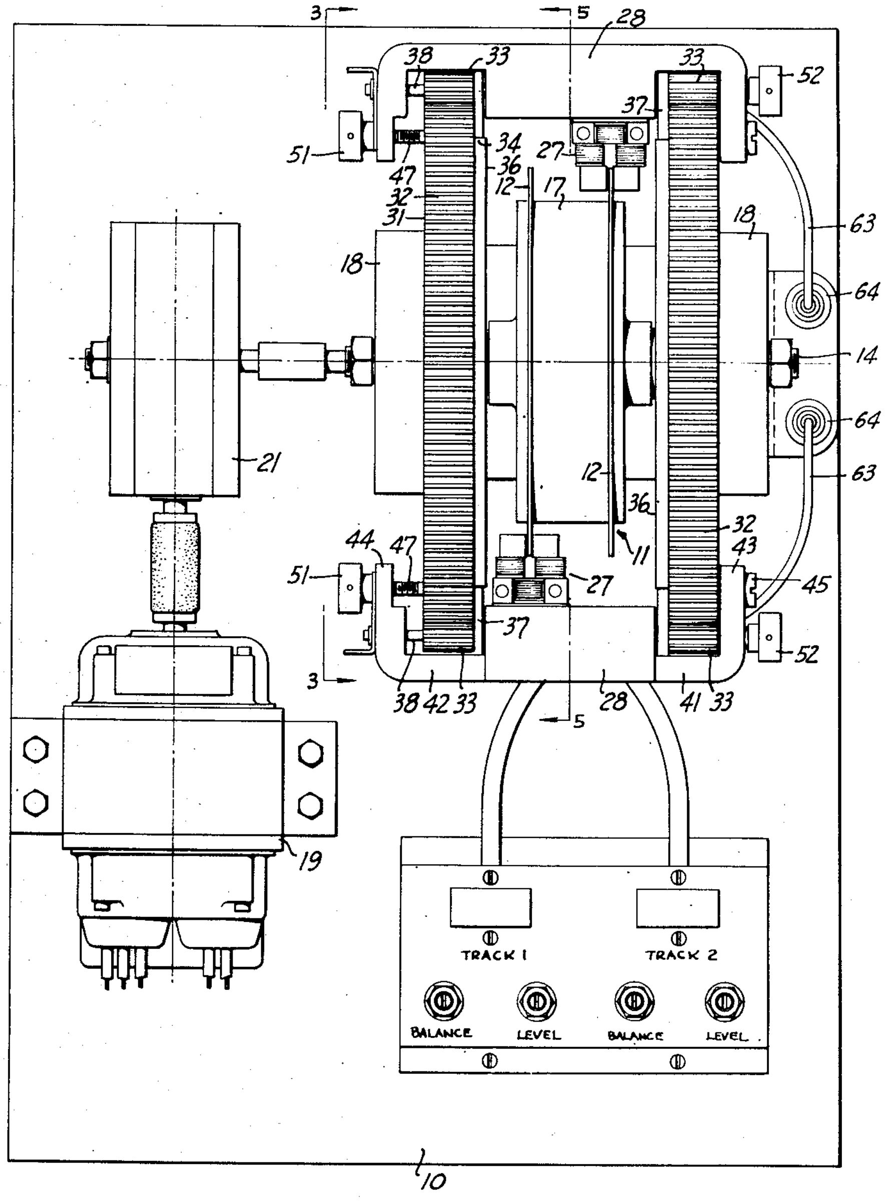
Figure 1 is a plan view showing an apparatus incorporating the present invention.

The apparatus as illustrated in the drawing consists of a suitable supporting panel 10 which carries the rotating structure 11. This structure carries one or more annuluses 12 which are made of magnetizable material, and which form continuous annular recording mediums. For convenience in construction, the annuluses 12 are mounted upon the thicker metal disks 13, and these disks in turn are mounted upon the shaft 14. By way of example, the annuluses can be made of suitable ferro magnetic material and disks 13 of aluminum. The disks are shown separated by the inner and outer spacers 16 and 17, although in instances where additional annuluses 12 are employed, such spacers can be replaced by additional disks. The shaft 14 is shown carried by the journal supports 18. It is driven by suitable means such as the electric motor 19 of the Selsyn type, which operates through the gearing 21.

Figures 2, 3, 5:
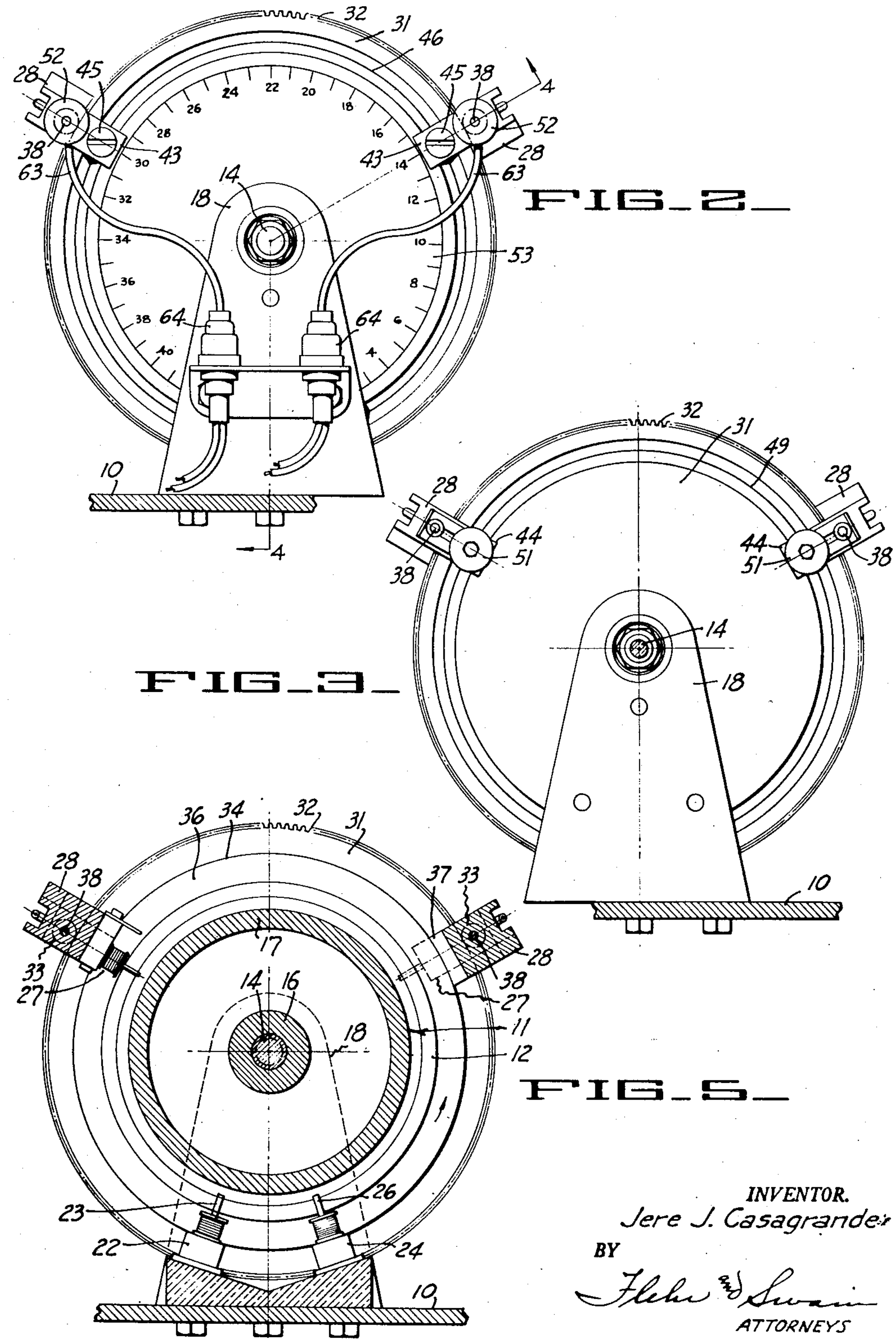
Figure 2 is an end view of a part of the apparatus shown in Figure 1, namely, the part incorporating the recording and pickup head assemblies.
Figure 3 is a view like Figure 2, but looking toward the other end of the apparatus.
Figure 5 is a cross-sectional view taken along the line 5—5 of Figure 1.
Figure 4:
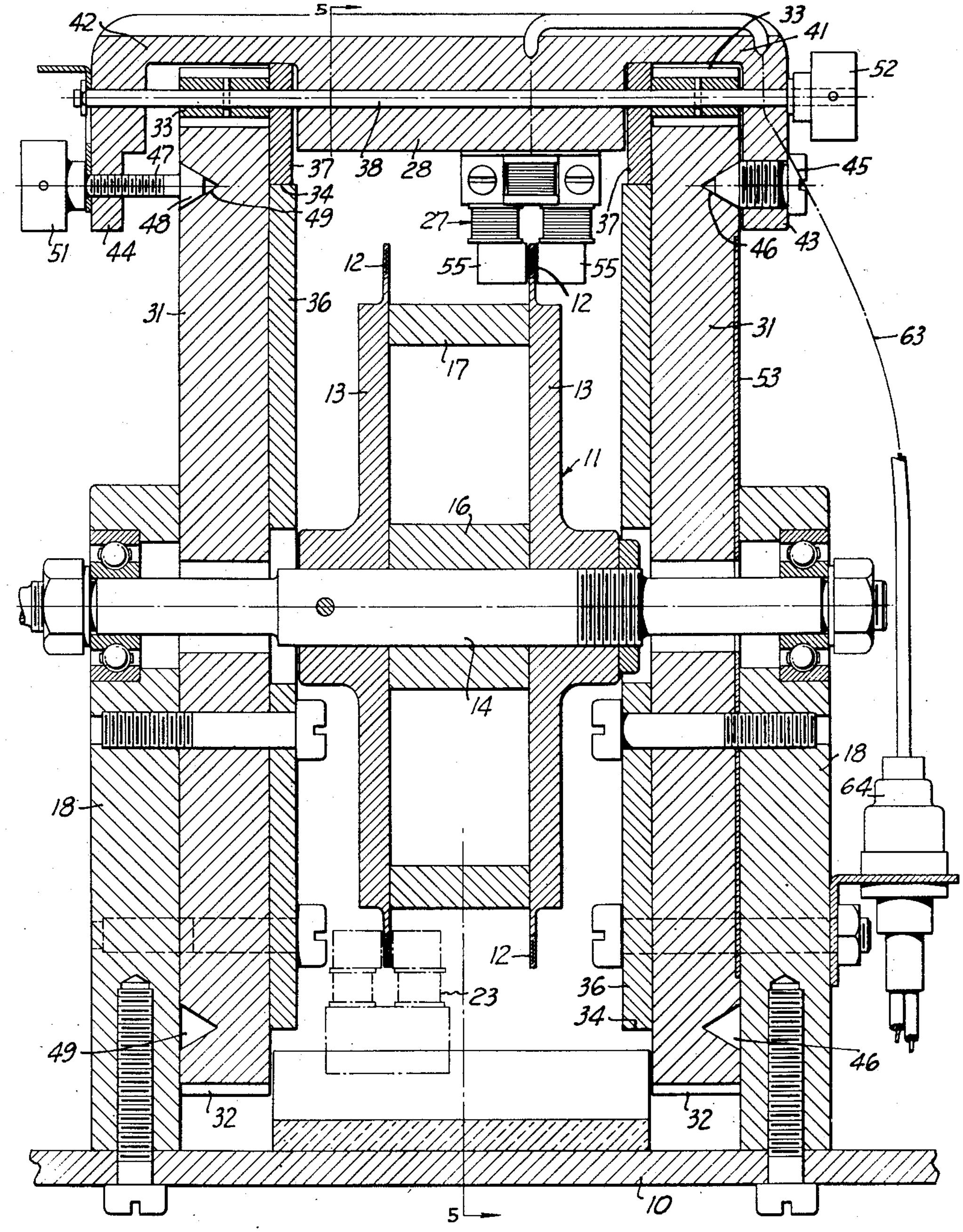
Figure 4 is a cross-sectional view taken along the line 4—4 of Figure 2, and on an enlarged scale.

In conjunction with the annuluses 12, I provide magnetic erase, record and pickup heads. The erase heads 22 are schematically illustrated in Figure 5. They are fixed with respect to the panel 10, and each head has pole pieces 23 which extend along opposite sides of the corresponding annulus 12. The record heads 24 are likewise mounted stationary, as for example on the panel 10, and each has pole pieces 26 disposed on opposite sides of the corresponding annulus. The record head can consist of a magnetic core formed U-shaped, and having its side legs provided with serially connected windings.

The pickup heads 27 are mounted upon the adjustable mounting blocks 28. Preferably these heads are of a type continuously excited by a constant frequency many times higher than the highest frequency to be recorded, as for example a frequency of the order of 200 C. P. S.

The mounting blocks 28 are carried by circular guide means concentric with the axis of shaft 14. The guide means is formed in this instance by the circular plates 31 which are disposed in fixed positions alongside the drum, and which may be attached to the journal supports 18. The outer periphery of each plate 31 is provided with gear teeth 32, for engagement with pinions 33. The inner face of each plate 31 is provided with a circular shoulder 34 formed by the outer peripheries of the disks 36. These shoulders 34 are engaged by the sliding shoes 37 carried by the blocks 28. A shaft 38 extends through each block 28 and serves to mount the pinions 33. Also this shaft extends through the shoes 37, whereby the shoes are loosely retained to ride upon the shoulders 34.

Each block 28 is provided with U-shaped end portions 41 and 42, which embrace the pinions 33. The inward extending branches 43 and 44 of these portions are provided with means which have releasable clamping engagement with the circular plates 31. Thus the branch 43 is provided with a setscrew 45, which extends into the V-shaped groove 46. As viewed in the direction of the axis of shaft 14, the groove is circular and concentric with the shaft axis. The branch 44 carries a threaded screw 47, and the enlarged end 48 of this screw seats within the V-shaped groove 49. This groove is formed in the same manner as groove 46. By turning the knob 51 on the screw 47, clamping forces can be applied between the screws 45 and 47, to hold the block 28 in a desired position. However, when it is desired to move the block 28, the screw 47 is loosened and the pinions 33 turned by turning the knob 52 on the pinion shaft 38. By means of this arrangement it will be evident that either one of the blocks 28 can be shifted to any desired angular position about the center of the shaft. By reference to the graduated scale 53, the angular positioning of the blocks 28 can be determined with reference to the recording head 24.

As previously mentioned, each of the mounting blocks 28 carries a magnetic pickup head 27. Each head is disposed in such a manner that the air gap between its pole pieces 55 is occupied by an associated magnetic annulus 12.

Figure 6:
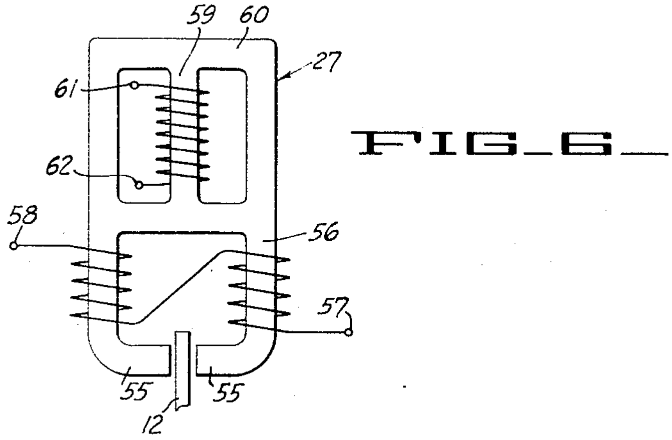
Figure 6 is a schematic illustrating the type of pickup head employed.

A suitable pickup head is shown schematically in Figure 6. The side branches of the main core 56 are provided with windings connected to the terminals 57 and 58 which in turn make connection with the input signal circuit. The center leg 59 of a symmetrical core extension 60 is provided with a winding connected to the terminals 61 and 62. These terminals are adapted to be connected to a source of exciting frequency, as for example a frequency compatible with the electrical characteristics of the particular pickup head, as for example 2000 C. P. S. A pickup head of this character is in effect a magetic modulator. Magnetic variations in the core extension 60 by virtue of excitation at a constant exciting frequency are balanced with respect to the main core 56, when that portion of the annulus 12 passing between the poles 55 does not carry a magnetically recorded signal. However, when a magnetic record passes between the pole pieces 55, the arrangement is unbalanced, and as a result voltage components are induced in the winding on the main core 56, and this unbalanced component is modulated by the record flux. This type of pickup head is particularly desirable in that it provides an output which is proportional to the record flux, and not, as in conventional recording practice, to the rate of change of flux.

As illustrated in Figure 2, flexible conductor cables 63 connect with the magnetic pickup heads, and lead to the stationary connectors 64.

Figure 7:
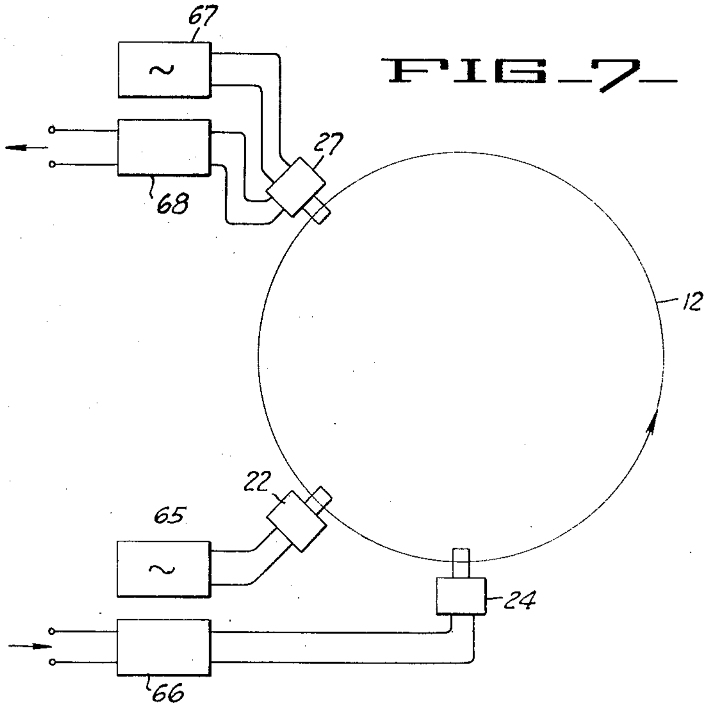
Figure 7 is a schematic circuit diagram for the apparatus.

Figure 7 schematically illustrates associated equipment connected to the various magnetic heads. For the sake of simplicity, only one of each of the heads is indicated. Thus a high frequency oscillator 65 connects to the erase head 22, whereby this head erases recordings from the corresponding annulus 12, before portions of the annulus reach the record head 24. The record heads 24 are shown connected to the output of an amplifier network 66, the input of which connects to a well indicating device. The pickup head 27 has one winding connected to the oscillator 67 or other source of exciting frequency, which, as previously stated, can be of the order of 2000 C. P. S., and the other winding of the head connects to the electronic network 68, which, as previously mentioned, may connect with additional recording or indicating means, such as a recorder of the pen type. For the type of well exploration previously mentioned, it is desirable for the annulus 12 to be driven at a speed which is synchronously related to the speed with which the well indicating devices are lowered into the well. This can be accomplished by utilizing a Selsyn driving unit mechanically connected to the cable winch which is employed to lower the indicating devices, with the source of driving unit being electrically connected to the Selsyn motor 19.

Assuming that the apparatus is being used in well exploration as previously mentioned, and assuming in this instance that only two vertically spaced well indicating devices are employed, one such device may be connected through an electronic amplifier channel to directly operate a pen recorder. The other device is connected to apply signals to the network 66, whereby magnetic records are formed on the annulus 12 by virtue of the recording heads 24. Assuming continuous rotation of the annuluses 12, it will be evident that a predetermined period will lapse before the record corresponding to a given signal arrives at the pickup head 27. The pickup head causes a corresponding signal to be applied to the recorder.

As previously mentioned, Figure 7 and the foregoing explanation apply to an assumed system employing only two detecting devices in the well, and where it is desired to interpose a time delay between the signals from one detecting device, thereby compensating for the vertical distance between these two devices as they are lowered into the well. In more complicated systems three or more detecting devices may be employed, thus requiring two or more magnetic annuluses 12 together with two or more erase record heads and pickup heads 27. The pickup head corresponding to each annulus 12 is moved to a position such as to give the time delay desired for that particular indicating device.

I claim:

1. In apparatus of the character described, a magnetic flux transducer including a magnetic core having a magnetic gap, an annulus of magnetic material, said annulus disposed to pass through the magnetic gap, means serving to mount said annulus for rotation about a fixed axis, means for adjustably supporting said transducer comprising a pair of circular guide means concentric to the axis of rotation of the annulus and disposed on opposite sides of said mounting means, a rack formed on the outer edge of said guide means, a mounting block carried by said guide means, a pinion carried by said mounting block whereby the block may be moved along said rack to thereby adjust the angular position of the transducer.

2. Apparatus as in claim 1 wherein said circular guide means include a circular shoulder formed thereon, shoes associated with said mounting means and adapted to ride in said shoulder.

3. Apparatus of the character described, a magnetic flux transducer including a magnetic core having a magnetic gap, an annulus of magnetic material, said annulus disposed to pass through said magnetic gap, means serving to mount said annulus for rotation about a fixed axis, means for adjustably supporting said transducer comprising a pair of circular guide means concentric to the axis of rotation and disposed on opposite sides of said mounting means, a rack formed on the outer edge of said guide means, a U-shaped mounting block carried by said guide means, said mounting block accommodating a pair of pinions, said pinions engaging said rack whereby the block may be moved along said rack to thereby adjust the position of the mounting means along said rack.

4. Apparatus as in claim 3 together with means for securely clamping said mounting means at a chosen position.

References Cited in the file of this patent

UNITED STATES PATENTS

| | | |
|---|---|---|
| 1,287,982 | Hartley | Dec. 17, 1918 |
| 2,427,421 | Rieber | Sept. 16, 1947 |
| 2,611,813 | Sharpless, et al. | Sept. 23, 1952 |
| 2,638,402 | Lee | May 12, 1953 |
| 2,683,254 | Anderson, et al. | July 6, 1954 |